(12) United States Patent
Garrido et al.

(10) Patent No.: US 10,931,725 B2
(45) Date of Patent: Feb. 23, 2021

(54) MULTIWAY AUDIO-VIDEO CONFERENCING

(71) Applicant: Apple Inc., Cupertino, CA (US)

(72) Inventors: Christopher M. Garrido, San Jose, CA (US); Thomas P. Devanneaux, Los Altos, CA (US); Yan Yang, San Jose, CA (US); Ming Jin, Saratoga, CA (US); Vu H. Chiem, San Jose, CA (US); Patrick Miauton, Redwood City, CA (US); Karthick Santhanam, San Jose, CA (US); David L. Biderman, Los Gatos, CA (US); Hsien-Po Shiang, Mountain View, CA (US); Eric L. Chien, Santa Clara, CA (US); Xiaoxiao Zheng, Santa Clara, CA (US); Bess C. Chan, Sunnyvale, CA (US); Komei Harada, Fremont, CA (US); Dazhong Zhang, Saratoga, CA (US)

(73) Assignee: Apple Inc., Cupertino, CA (US)

(*) Notice: Subject to any disclaimer, the term of this patent is extended or adjusted under 35 U.S.C. 154(b) by 209 days.

(21) Appl. No.: 16/147,527

(22) Filed: Sep. 28, 2018

(65) Prior Publication Data

US 2019/0104163 A1   Apr. 4, 2019

Related U.S. Application Data

(60) Provisional application No. 62/679,896, filed on Jun. 3, 2018, provisional application No. 62/565,910, filed on Sep. 29, 2017.

(51) Int. Cl.
*H04L 29/06* (2006.01)
*H04N 7/14* (2006.01)
*H04N 7/15* (2006.01)

(52) U.S. Cl.
CPC ........ *H04L 65/403* (2013.01); *H04L 65/1089* (2013.01); *H04L 65/80* (2013.01); *H04N 7/147* (2013.01); *H04N 7/15* (2013.01)

(58) Field of Classification Search
CPC ... H04L 65/403; H04L 65/80; H04L 65/1089; H04N 7/15; H04N 7/147; H04N 7/155
See application file for complete search history.

(56) References Cited

U.S. PATENT DOCUMENTS 7,313,593 B1 * 12/2007 Pulito .................... G06Q 10/10
                                                           370/260
9,344,218 B1 *  5/2016 Liu .......................... H04L 1/08
(Continued)

FOREIGN PATENT DOCUMENTS

WO    WO 03/058465    7/2003
WO    WO 2012/166444  12/2012

OTHER PUBLICATIONS

Tian et al., "Parity Streams: A Novel FEC Scheme with the Stream Control Transmission Protocol," IEEE Communications Letters, Jun. 2006, vol. 10, No. 6, pp. 498-500.

(Continued)

*Primary Examiner* — Will W Lin
(74) *Attorney, Agent, or Firm* — Morgan, Lewis & Bockius LLP

(57) ABSTRACT

A device implementing a system for audio-video conferencing using multiple stream identifiers includes a processor configured to receive, from a sending device, indication of a first content stream and a first stream identifier, and indication of a second content stream and a second stream identifier associated. The first content stream and the second content stream correspond to different bit rates of streaming content. The processor is configured to receive, from a receiving device, a request to subscribe to the second content stream, the request including the second stream identifier, (Continued)

and receive, from the sending device, an indication that the second stream identifier has been associated with the first content stream. The processor is configured to forward, to the receiving device, the first content stream based on the request to subscribe to the second content stream and on the indication that the second stream identifier has been associated with the first content stream.

20 Claims, 10 Drawing Sheets

(56) References Cited

U.S. PATENT DOCUMENTS

| | | | | |
|---|---|---|---|---|
| 10,225,000 | B1* | 3/2019 | Chowdhury | H04L 41/0806 |
| 2002/0126201 | A1* | 9/2002 | Schmitt | H04N 7/152 |
| | | | | 348/14.09 |
| 2004/0141759 | A1* | 7/2004 | Stiscia | H04L 63/0428 |
| | | | | 398/168 |
| 2008/0086755 | A1* | 4/2008 | Darnell | H04N 21/4782 |
| | | | | 725/105 |
| 2008/0158339 | A1* | 7/2008 | Civanlar | H04N 7/152 |
| | | | | 348/14.09 |
| 2009/0168773 | A1* | 7/2009 | Crookes | H04N 21/64307 |
| | | | | 370/389 |
| 2010/0088426 | A1* | 4/2010 | Takemura | H04N 21/64322 |
| | | | | 709/231 |
| 2010/0153574 | A1 | 6/2010 | Lee et al. | |
| 2011/0157298 | A1 | 6/2011 | Huang et al. | |
| 2011/0161836 | A1 | 6/2011 | Mu et al. | |
| 2013/0100970 | A1* | 4/2013 | Vafin | H04L 1/0036 |
| | | | | 370/517 |
| 2013/0152153 | A1* | 6/2013 | Weiser | H04L 65/1006 |
| | | | | 726/1 |
| 2015/0131657 | A1* | 5/2015 | Oyman | H04W 56/00 |
| | | | | 370/390 |
| 2015/0180924 | A1* | 6/2015 | O'Callaghan | H04L 43/0829 |
| | | | | 709/219 |
| 2015/0264103 | A1* | 9/2015 | Kim | H04L 65/608 |
| | | | | 709/219 |
| 2015/0326868 | A1* | 11/2015 | Ezhov | H04N 21/00 |
| | | | | 709/219 |
| 2015/0334152 | A1* | 11/2015 | Oyman | H04W 76/11 |
| | | | | 709/219 |
| 2015/0350604 | A1* | 12/2015 | Roy | H04L 65/00 |
| | | | | 348/14.09 |
| 2016/0112673 | A1 | 4/2016 | Feng et al. | |
| 2016/0241410 | A1 | 8/2016 | Lemoine | |
| 2017/0034224 | A1* | 2/2017 | Baram | H04L 65/605 |
| 2017/0201571 | A1* | 7/2017 | Sherf | H04L 43/0817 |
| 2017/0251246 | A1 | 8/2017 | Hua | |
| 2017/0339415 | A1* | 11/2017 | Wang | H04N 21/84 |

OTHER PUBLICATIONS

International Search Report and Written Opinion from PCT/US2019/023224, dated Aug. 21, 2019, 20 pages.

Invitation to Pay Additional Fees from PCT/US2019/023224, dated Jun. 27, 2019, 16 pages.

* cited by examiner

MULTIWAY AUDIO-VIDEO CONFERENCING

CROSS-REFERENCE TO RELATED APPLICATIONS

The present application claims the benefit of U.S. Provisional Patent Application Ser. No. 62/679,896, entitled "MULTIWAY AUDIO-VIDEO CONFERENCING," filed Jun. 3, 2018 and U.S. Provisional Patent Application Ser. No. 62/565,910, entitled, "MULTI-DEVICE COMMUNICATION MANAGEMENT," filed Sep. 29, 2017, which are hereby incorporated herein by reference in its entirety and made part of the present U.S. Utility Patent Applications for all purposes.

TECHNICAL FIELD

The present description relates generally to audio-video conferencing, such as videotelephony, including multiway audio-video conferencing.

BACKGROUND

A user of an electronic device may participate in audio and/or video conferencing with other participants using their respective devices. Each of the participant devices may be associated with network conditions (e.g., downlink bandwidth, packet loss) specific to that device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
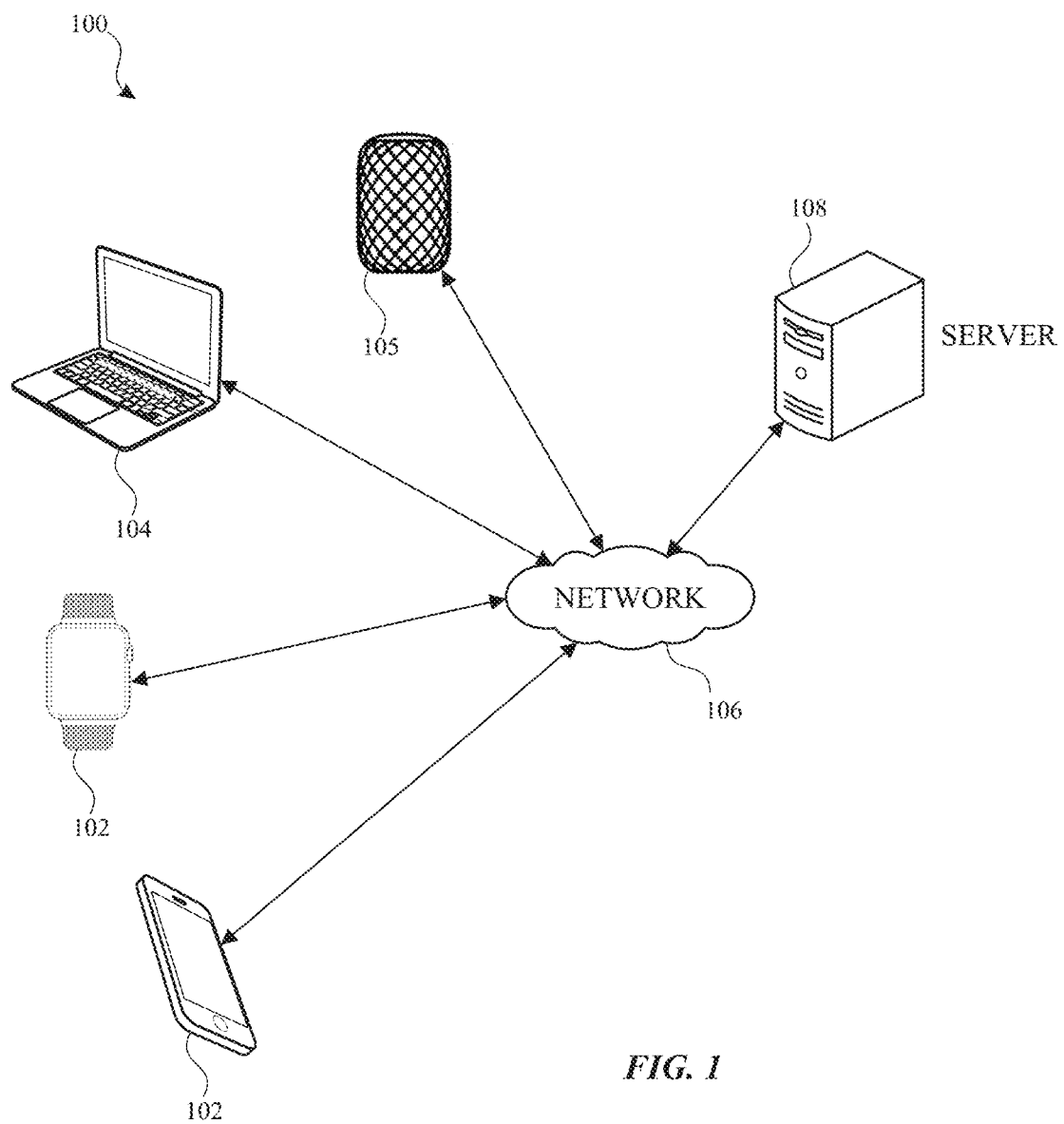
FIG. 1 illustrates an example network environment for multiway audio-video conferencing in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Audio-video conferencing provides for the reception and transmission of audio and/or video signals by user devices (e.g., at different locations), for communication between users in real-time. In some cases, two users may utilize audio-video conferencing to communicate with each other in one-to-one communication at their respective devices. In other cases, multiway audio-video conferencing may be utilized by more than two users to participate in a real-time, group conversation.

In some systems of multiway audio-video conferencing, network degradation may be experienced by one or more of the participant devices. In the one-to-one audio-video conferencing example, the two participating devices may both switch from a high quality/bitrate stream to a lower quality/bitrate stream, in order to accommodate for the bandwidth degradation. However, when there are more than two participants in an audio-video conference, switching all of the participant devices to a lower quality/bitrate content stream because a single participant device has bandwidth constraints may result in a degradation of the audio-video conference experience for all of the participants.

The subject system provides for multiway audio-video conferencing in which respective stream identifiers are assigned to each content stream and/or parity stream made available for transmission by a participant device. The stream identifiers are published to the other participant devices in the audio-video conference, so that each of the other participant devices may individually subscribe to a particular content stream and/or parity stream. In the case of uplink packet loss and/or network degradation during the audio-video conference, the sending device may update its available streams and/or parity streams (e.g., identifiable by respective stream identifiers) for transmission of streaming content. In addition, in case of downlink packet loss and/or network degradation, the receiving device may update its subscription(s) to content streams and/or parity streams for receiving streaming content. In this manner, it is possible to reduce degrading the group experience in a case where one device (or a small subset of devices) experiences packet loss and/or network degradation. In addition, the participant devices may independently and dynamically adapt to changing uplink and downlink conditions.

The subject system may also provide for the transmission of content streams and/or parity streams to be end-to-end encrypted between devices, where each receiving device may decrypt transmissions using a key. In this manner, a forwarding server facilitating the transmission of content would be unable to access the content streams and/or parity streams, thereby maintaining privacy for the participants of the audio-video conference.

FIG. 1 illustrates an example network environment for multiway audio-video conferencing in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, 104 and 105 (hereinafter 102-105), a network 106 and a server 108. The network 106 may communicatively (directly or indirectly) couple, for example, any two or more of the electronic devices 102-105 and the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-105 and a single server 108; however, the network environment 100 may include any number of electronic devices and any number of servers.

One or more of the electronic devices 102-105 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 103 is depicted as a smartwatch, the electronic device 104 is depicted as a laptop computer, and the electronic device 105 is depicted as a smart speaker.

The electronic devices 102-105 may be configured to participate in audio-video conferencing, for example, where the electronic devices 102-105 may participate in a group conversation in which video and/or audio content streams are transmitted between the participant devices. In the example of FIG. 1, the electronic device 105 (e.g., smart speaker) may participate with content stream(s) in audio (e.g., and not video). As discussed below with reference to FIGS. 3-5 and 6A-6B, each of the participant devices may be configured to publish respective available content streams (e.g., with stream identifiers) and/or parity streams (e.g., with stream identifiers) for sending streaming content, and may subscribe to respective content streams and/or parity streams for receiving streaming content. Each of the electronic devices 102-105 may be, and/or may include all or part of, the device discussed below with respect to FIG. 2, and/or the electronic system discussed below with respect to FIG. 10.

The server 108 may be, and/or may include all or part of the device discussed below with respect to FIG. 2, and/or the electronic system discussed below with respect to FIG. 10. The server 108 may include one or more servers, such as a cloud of servers, that may be used to facilitate in audio-video conferencing between the electronic devices 102-105. For explanatory purposes, a single server 108 is shown and discussed with respect to various operations, such as facilitating in audio-video conferencing. However, these and other operations discussed herein may be performed by one or more servers, and each different operation may be performed by the same or different servers.

Figure 2:
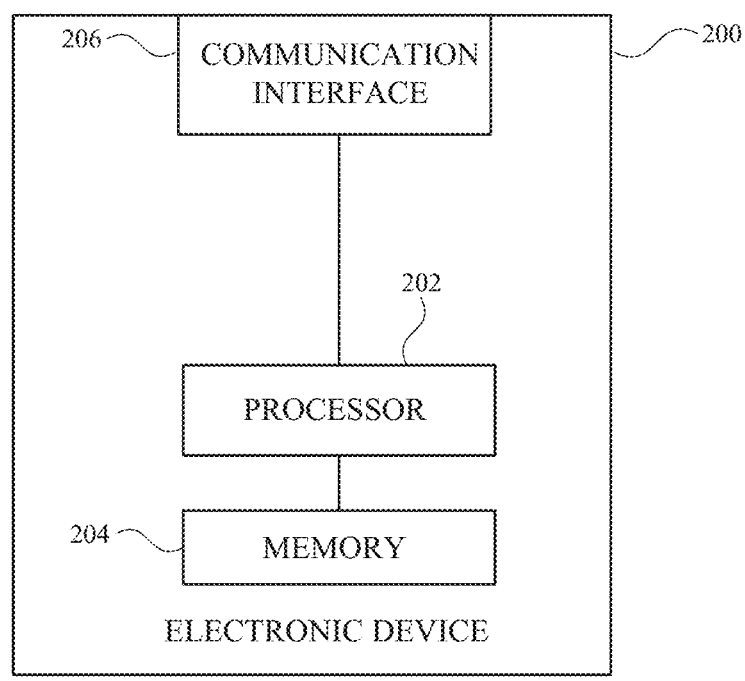
FIG. 2 illustrates an example device that may implement a system for multiway audio-video conferencing in accordance with one or more implementations.

FIG. 2 illustrates an example device that may implement a system for multiway audio-video conferencing in accordance with one or more implementations. For example, the device 200 of FIG. 2 can correspond to any of the electronic devices 102-105, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, and a communication interface 206. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200. In the subject system, the processor 202 may implement architecture(s) for audio-video conferencing using multiple streams as discussed further below with respect to FIGS. 3-5 and 6A-6B.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102-105, the memory 204 may store an application (e.g., an audio-video conferencing application) which is configured to facilitate in providing and receiving multiple content streams and/or parity streams as part of an audio-video conference. In one or more implementations, the audio-video conferencing application may be part of or otherwise incorporated within the operating system of the electronic devices 102-105.

In one or more implementations, in a case where the device 200 corresponds to the server 108, the memory 204 may store one or more components configured to work in conjunction with the above-mentioned device application (e.g., the audio-video conferencing application), to facilitate in providing for audio-video conferencing between the multiple participant devices (e.g., the electronic devices 102-105).

The communication interface 206 may include suitable logic, circuitry, and/or code that enables wired or wireless communication, such as between any of the electronic devices 102-105 and the server 108 over the network 106. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
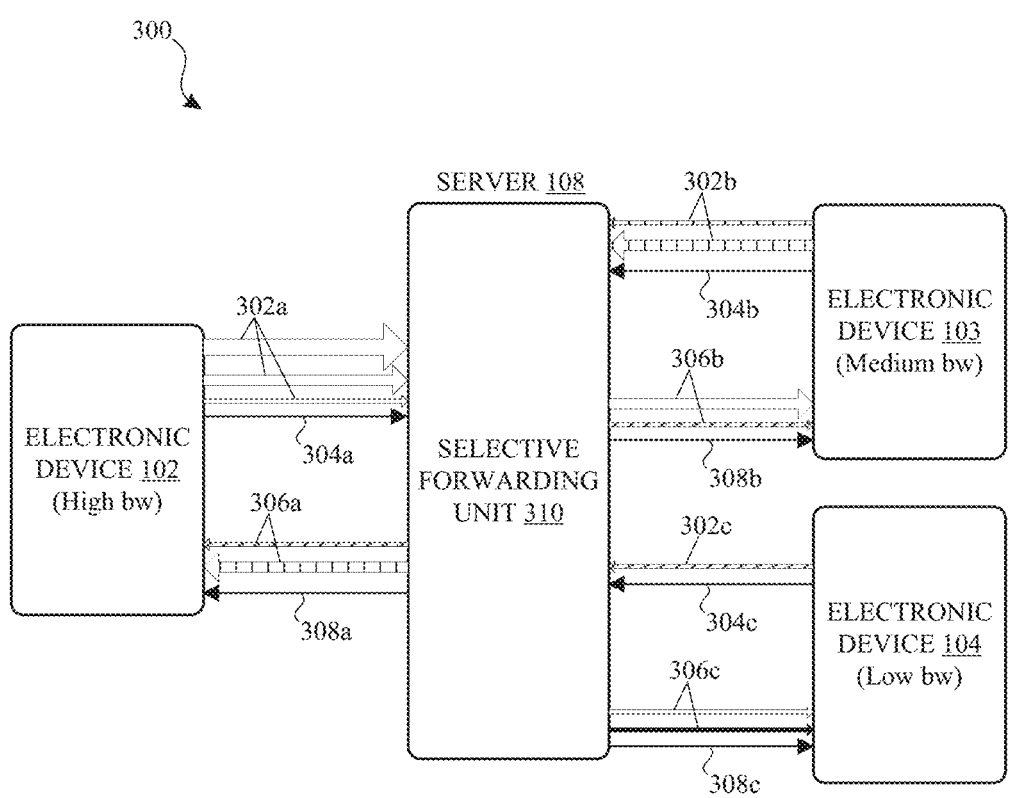
FIG. 3 illustrates an example architecture of a system for multiway audio-video conferencing in accordance with one or more implementations.

FIG. 3 illustrates an example architecture of a system for multiway audio-video conferencing in accordance with one or more implementations. For example, the system 300 can be implemented by one or more software modules running on the respective processors 202 of the server 108 and/or the electronic devices 102-104. While FIG. 3 refers to the electronic devices 102-104, any of the electronic devices 102-105 may be used instead. In one or more implementations, the system 300 can be implemented by one or more software modules and/or by custom hardware (e.g., one or more coprocessors, ASICs, etc.). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 3, the system 300 includes a selective forwarding unit 310, which may be implemented on a server (e.g., the server 108) and coupled to the electronic devices 102-104 via the network 106. Each of the electronic devices 102-104 may publish indications of respective available uplink content streams 302a-302c, for example, together with one or more available uplink parity streams 304a-304c. In addition, each of the electronic devices 102-104 may subscribe to receive respective downlink content streams 306a-306c, for example, together with one or more associated downlink parity streams 308a-308c as appropriate.

As noted above, the system 300 provides for audio-video conferencing between two or more participant devices, for example, the electronic devices 102-104. An audio-video conferencing application may be installed on each participating electronic device. The audio-video conferencing application on a sending device (e.g., the electronic device 102) may facilitate in transmitting streaming content for receipt by other participant devices (e.g., the electronic devices 103-104) running respective instances of the audio-video conferencing application. The electronic device 102 may also subscribe to receive streaming content that is transmitted by the electronic devices 103-104.

The streaming content can correspond to audio and/or video content captured by sensors (e.g., microphones, video cameras) on each participating device, for example, corresponding to real-time video and/or audio capture of the users (e.g., faces) and/or other sights and sounds captured by the respective device. In one or more implementations, one or more of the devices may transmit a mesh of points captured from, and representative of, a user's face. Moreover, the streaming content may be supplemented with additional audio and/or visual data (e.g., animations, overlays, emoticons and the like), for example, in conjunction with extension applications and/or widgets associated with the audio-video conferencing application.

A user at the electronic device 102 wishing to initiate an audio-video conference (e.g., a group conversation) may select participant(s) via an audio-video conferencing application, and/or may initiate the audio-video conference from a different mode of communication, such as group text messaging, a group voice call, etc. For example, the participants may be selected from contacts included within a contact address book stored on the electronic device 102. The user may initiate the audio-video conference by selecting an appropriate user interface element provided by the audio-video conferencing application, thereby prompting the invited participants, at their respective devices (e.g., the electronic devices 103-104), to accept or decline participation in the audio-video conference.

When one or more of the participants have accepted the invitation (e.g., via the prompt provided by the audio-video conferencing application), the selective forwarding unit 310 may perform an initialization procedure in which session information is published between the multiple participant devices. In one or more implementations, each of the participant electronic devices 102-104 provides respective session information to the selective forwarding unit 310, which in turn publishes the session information to the other participant devices. The session information for each device may indicate the uplink content streams that are available by the device, the uplink parity streams that are available (if any) for each uplink content stream, and respective stream identifiers for each of the uplink content streams and each of the uplink parity streams. For each available content stream, the session information may indicate one or more parameters, including but not limited to, a maximum bit rate, an audio codec and a video resolution. In addition, the session information may indicate statistics for each content stream, including numbers of packets (e.g., transmitted and/or received), timestamps (e.g., for transmitted and/or received packets), byte statistics (e.g., transmitted and/or received), actual bit rates, sequence numbers associated with transmitted and/or received packets, and the like. By sharing the respective session information amongst the electronic devices 102-104, it is possible for each of the electronic devices 102-104 to subscribe to receive a particular content stream and/or parity stream being transmitted by other participant devices.

Regarding the sending of content, the number of available uplink streams for each of the respective electronic devices 102-104 may vary based on uplink bandwidths associated with the devices. In the example of FIG. 3, the electronic device 102 may have high uplink bandwidth (e.g., due to low network degradation and/or low packet loss associated with the uplink), and therefore may transmit content streams in high, medium and low quality and/or bitrate. The electronic device 102 may communicate an indication of the available content streams to the selective forwarding unit 310 as part of its session information.

With respect to the session information, the electronic device may assign a stream identifier (e.g., IDs 1, 2 and 3, not shown) to respective ones of the uplink content streams 302a together with an indication of the quality/bitrate level (e.g., high, medium, low and/or max bit rate, video resolution and the like, and/or may specify the actual bit rate and other parameters) associated with each stream identifier. In the example of FIG. 3, the electronic device 102 is illustrated as transmitting three uplink content streams 302a. The uplink content streams 302a are depicted in FIG. 3 by varying thicknesses to represent the high quality/bitrate content stream (e.g., thickest of 302a), the medium quality/bitrate content stream (e.g., medium thickness in 302a) and the low quality/bitrate content stream (e.g., thinnest of 302a).

Further, the electronic device 103 may have medium uplink bandwidth, and may therefore transmit two content streams 302b (e.g., which may be identifiable by the stream identifiers as part of the session information) corresponding to medium and low quality/bitrate. In addition, the electronic device 104 may have low uplink bandwidth, and transmit a single content stream content stream 302c (e.g., which may be identifiable by the stream identifier as part of the session information) corresponding to low quality/bitrate.

With respect to receiving content, the available downlink streams for each of the electronic devices may correspond to the uplink streams made available by the other participant devices (e.g., per the session information provided by the selective forwarding unit 310). In this regard, a receiving device may choose to subscribe to a downlink stream based on the downlink bandwidth for that receiving device. In the example of FIG. 3, the electronic device 102 may have high downlink bandwidth, and therefore select to subscribe to a high quality/bitrate (e.g., the highest available) of downlink streaming content. Thus, the downlink content streams 306a for the electronic device 102 may correspond to the highest quality/bitrate available uplink streams as made available by the electronic device 103 (e.g., medium quality) and the electronic device 104 (e.g., low quality). On the other hand, the electronic device 103 may have medium downlink bandwidth. As such, the downlink content streams 306b that the electronic device 103 subscribes to may correspond to a medium quality/bitrate as transmitted by the electronic device 102 (e.g., although the electronic device 102 also transmits in high quality), and the low quality/bitrate as transmitted by the electronic device 104. Moreover, the electronic device 104 may have low downlink bandwidth, and the downlink content streams 306c may correspond to low quality/bitrate as transmitted by the electronic devices 102-103 (e.g., although high and medium quality streams are available). In one or more implementations, one or more of the electronic devices 102-104 may have asymmetric bandwidth constraints, e.g. low uplink bandwidth and high downlink bandwidth.

Each of the electronic devices 102-104 are further configured to transmit uplink parity streams 304a-304c and/or to receive downlink parity streams 308a-308c. For example, the parity streams 304a-304c and 308a-308c may correspond to forward error correction (FEC) streams with error correcting code for the recovery of streaming content transmitted in one or more of the other content streams. As noted above, a parity stream may or may not be available for each content stream transmitted by a sending device. Thus, while FIG. 3 illustrates each of uplink parity streams 304a-304c as single lines, there may be separate parity streams made available for each respective content stream (e.g., three parity streams for the three uplink content streams 302a). Moreover, each parity stream may be identified by a respective stream identifier, where the stream identifiers for the parity streams differ from those of their corresponding content streams. As noted above, the parity stream identifiers may be included within the session information shared amongst the electronic devices 102-104 during the initialization phase. The parity streams for each device may be transmitted by the respective electronic device (e.g., 102), for receipt by the other electronic devices (e.g., 103-104).

In view of the above, the system 300 provides for each of the participating electronic devices 102-104 to publish (e.g., automatically, without user input) their respective available content streams 302a-302c with stream identifiers and/or corresponding uplink parity streams 304a-304c with stream identifiers. Moreover, each of the participating devices is provided with options of which content streams and/or parity streams to subscribe to. For example, depending on the downlink bandwidth, a receiving device may subscribe (e.g., automatically, without user input) to higher and/or lower content streams based on the available content streams as published by the sending devices. In another example, the receiving device may subscribe to a parity stream, for example, in a case of downlink packet loss.

With respect to uplink packet loss, a sending device (e.g., the electronic device 102) may determine packet loss based on feedback provided by the selective forwarding unit 310. For example, after transmitting packets on the uplink for a content stream, the electronic device 102 may probe the selective forwarding unit 310 for the number of packets that were received by the selective forwarding unit 310. The electronic device 102 can determine packet loss by comparing the number of packets that were sent to the selective forwarding unit 310 (e.g., 10 packets) with the number of packets that the selective forwarding unit 310 indicated were received in response to the probe (e.g., 9 packets). The electronic device 102 may have predefined acceptable margins for packet loss (e.g., 5% loss). Alternatively or in addition, the electronic device 102 may have predefined acceptable rates of change for packet loss (e.g., less than 10%/o increase per 5 seconds).

Upon determining that packet loss and/or the rate of packet loss is not acceptable based on the predefined values, the sending device may enable parity stream(s) (e.g., if currently disabled), and publish the enabled parity streams to the receiving devices, for example, via the selective forwarding unit 310. Thus, the receiving devices may be notified (e.g., by out-of-band signaling) that previously-unavailable parity stream(s) have become available.

Regarding downlink packet loss, the receiving devices (e.g., the electronic devices 103-104) may detect that such packet loss occurs based on a comparison of the number of packets sent by the selective forwarding unit 310 (e.g., in response to a probe request by the receiving device) and the number of packets locally received at the receiving device, such as based on the number of retransmissions requested by the receiving device. Acceptable margins of packet loss and/or rates of change for downlink packet loss may be used by the receiving device to determine to subscribe to a parity stream. For example, provided the receiving device has sufficient bandwidth, the receiving device may subscribe to a parity stream corresponding to the content stream from which the packet loss was detected. If the receiving does not have sufficient bandwidth, the receiving device may subscribe to a lower-quality content stream (e.g., switch from high to low) together with its respective parity stream.

In addition, each of the sending and receiving devices may determine changes in bandwidth (e.g., bandwidth degradation). For uplink bandwidth, the sending device (e.g., the electronic device 102) may determine changed bandwidth conditions based on a local timestamp associated with when packets were sent to the selective forwarding unit 310 and a server-based timestamp for when the selective forwarding unit 310 received the packets (e.g., in response to a probe request). The electronic device 102 may have predefined acceptable margins for the differences between the two timestamps (e.g., based on running averages). Alternatively or in addition, the electronic device 102 may have predefined acceptable rates of change for uplink slowdown (e.g., no more than 10% slowdown per 5 seconds).

Upon determining that the difference in bandwidth timestamps and/or the rate of change is not acceptable based on the predefined values, the sending device may disable a content stream (e.g., a high quality/bitrate content stream) and/or its parity stream. In addition, the sending device may publish that the content stream and/or parity stream is no longer available (e.g., by removing the corresponding stream identifier(s) from shared the session information). Thus, the receiving device would be required to switch from the disabled stream (e.g., a high quality stream) to a lower-quality stream. In one or more implementations, such switching may be effected in conjunction with the use of compound stream identifiers, which are discussed further below with respect to FIGS. 6A-6B.

Alternatively or in addition, if a higher quality/bitrate stream is disabled and the sending device detects that the current bandwidth conditions may support the higher quality/bitrate stream (e.g., based on the above-mentioned timestamp data), the sending device may activate the higher-quality stream and/or parity stream. The sending device may publish that the content stream and/or parity stream is available, for example, via the selective forwarding unit 310. Thus, the receiving devices may be notified (e.g., by in-band or out-of-band signaling) that previously-unavailable content stream has become available.

Regarding downlink bandwidth changes, the receiving devices may determine changing downlink bandwidth conditions based on a local timestamp associated with when packets were received by the receiving device and a server-based timestamp for when the selective forwarding unit 310 sent the packets to the receiving device (e.g., in response to a probe request). Acceptable margins of timestamp differences (e.g., based on running averages) and/or rates of change for downlink slowdown may be used by the receiving device to unsubscribe to a particular content stream and/or parity stream. For example, provided the receiving device has sufficient bandwidth, the receiving device may subscribe to a lower-quality content stream and its corresponding parity stream. If the receiving device does not have sufficient bandwidth, the receiving device may subscribe to the lower-quality content stream without corresponding to its corresponding parity stream. Alternatively or in addition, if bandwidth conditions support switching subscription to a higher quality-bitrate content stream (e.g., based on the above-mentioned timestamp data), the receiving device may subscribe to the higher-quality content stream.

In one or more implementations, in a case where a receiving device subscribes to a parity stream for a content stream, the receiving device may indicate a parity level for that parity stream. As noted above, the receiving device may opt to enable a parity stream upon detecting downlink packet loss. Based on the amount of packet loss and/or the rate of change for the downlink packet loss, the receiving device may select a parity level from among a predefined set of parity levels. For example, the selective forwarding unit 310 may provide the receiving device with selectable parity levels of 25% parity, 50%, 75% parity, 100% parity and 200% parity. In response to receiving a selection (e.g., 50% parity), the selective forwarding unit 310 may adjust the parity stream provided by the sending device (e.g., the electronic device 102) to correspond with the selected level (e.g., 50% parity). The selective forwarding unit 310 may receive the selected parity level from the receiving device, and puncture the parity stream to correspond with the selected level (e.g., 50% parity).

In one or more implementations, the transmission of content streams and/or parity streams by a sending device (e.g., the electronic device 102) to the receiving devices (e.g., the electronic devices 103-104) may be end-to-end encrypted. For example, the electronic device 102 may send encrypted content streams and encrypted parity streams (e.g., corresponding to streaming video and/or audio content) to the selective forwarding unit 310, which in turn forwards the appropriate content streams and encrypted parity streams to the respective electronic devices 103-104. Each of the electronic devices 103-104 may have a key for decrypting the content streams and/or the parity streams. In a similar manner, the electronic device 102 may have a key for decrypting content streams and/or the parity streams received from the electronic devices 103-104. In one or more implementations, one or more master keys may be shared by the electronic devices 102-104 for encrypting and decrypting the content. The key(s) may not be provided to the selective forwarding unit 310 (e.g., and thereby the server 108), such that the server 108 cannot decrypt the content streams and/or parity streams. In this manner, privacy of the content shared by the participants within the group conversation (e.g., via audio-video conferencing) may be maintained.

As noted above, a receiving device may switch from one content stream and/or parity stream to another content stream and/or parity stream. For example, such switching may occur when the receiving device detects a change in bandwidth conditions (e.g., to indicate switching to a lower or a higher quality stream). To perform the switch, the receiving device may first be required to receive a key frame from the new content stream, such as an I frame, an instantaneous decoder refresh (IDR) frame, and/or another random access point.

In this regard, the requirement to wait for a key frame may be based on inter-frame dependencies associated with packets of a content stream. To account for the key frame requirement, the receiving device may, for a temporary period of time, continue its subscription of the old content stream and also opt into the new content stream (e.g., provided that there is sufficient downlink bandwidth). During this temporary period of time, the receiving device may receive two content streams. The receiving device may then wait for the new content stream to provide a key frame. The receiving device may the initialize a decoder for the new content stream based on the received key frame in order to receive the new content stream, and then unsubscribe from the old content stream. The sending device may receive notice of the receiving device opting to unsubscribe (e.g., by way of an out-of-band signal via the selective forwarding unit 310), and may disable the old content stream, provided that there are no other subscribing devices for the old content stream. In one or more implementations, the stream switching may be automatically handled by the selective forwarding unit 310, such as at the next random access point.

In another example, the receiving device may switch to a lower-quality content stream due to uplink bandwidth degradation. In a case where the receiving device is switching to a lower-quality content stream due to uplink bandwidth degradation, the sending device may provide for compound stream identifiers. For example, the sending device may associate the stream identifier for the (e.g., now disabled) high-quality stream with an enabled lower-quality content stream. Since the receiving device may already be subscribed to the higher-quality content stream (e.g., via its stream identifier), the receiving device may automatically begin to receive the lower-quality content stream, based on the association of the stream identifier with the lower-quality content stream. The use of compound stream identifiers is discussed further below with respect to FIGS. 6A-6B.

In one or more implementations, the components of the system 300 (e.g., the selective forwarding unit 310), are implemented via software instructions, stored in the memory 204 (e.g., of the server 108), which when executed by the respective processor 202, cause the respective processor 202 to perform particular function(s).

In one or more implementations, one or more of the components of the system 300 (e.g., the selective forwarding unit 310) may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
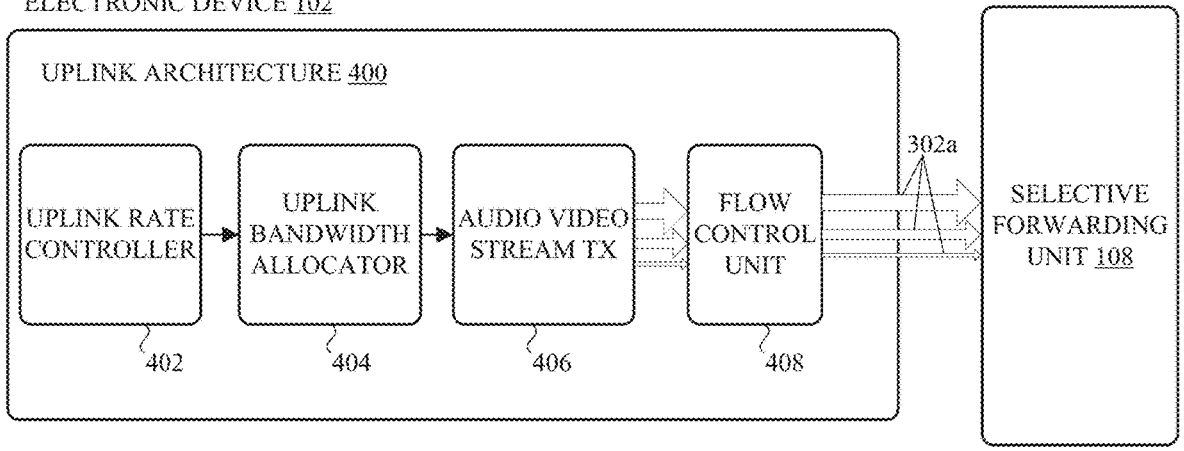
FIG. 4 illustrates an example uplink architecture for a device participating in multiway audio-video conferencing in accordance with one or more implementations.

FIG. 4 illustrates an example uplink architecture for a device participating in multiway audio-video conferencing in accordance with one or more implementations. In the example of FIG. 4, the uplink architecture 400 is illustrated and described with respect to the electronic device 102. However, the uplink architecture 400 can be implemented by one or more software modules running on the processor 202 of any of the electronic devices 102-105. In another example, the uplink architecture 400 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The uplink architecture 400 includes an uplink rate controller 402, an uplink bandwidth allocator 404, an audio/video stream transmitter 406 and a flow control unit 408. Thus, the output of the uplink architecture 400 may correspond to the uplink content streams 302a that are provided to the selective forwarding unit 310, as described above with respect to FIG. 3.

In order to generate the uplink content streams 302a, the uplink rate controller 402 may be configured to control or otherwise adjust the bitrate of audio and/or video content (e.g., as captured by sensors such as a microphone and video camera on the electronic device 102) for transmission. In one or more implementations, the uplink rate controller 402 may include and/or may be communicatively coupled to one or more video encoders or transcoders. In addition, the uplink bandwidth allocator 404 may be configured to allocate respective bandwidths for the content streams. Based on the signals received by the uplink rate controller 402 and the uplink bandwidth allocator 404, the audio/video stream transmitter 406 may transmit the audio and video content streams, in conjunction with the flow control unit 408.

In one or more implementations, the uplink architecture 400, including the uplink rate controller 402, the uplink bandwidth allocator 404, the audio/video stream transmitter 406 and the flow control unit 408 are implemented via software instructions, stored in the memory 204 (e.g., of the electronic device 102), which when executed by the processor 202, cause the processor 202 to perform particular function(s).

In one or more implementations, one or more of the uplink rate controller 402, the uplink bandwidth allocator 404, the audio/video stream transmitter 406 and the flow control unit 408 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 5:
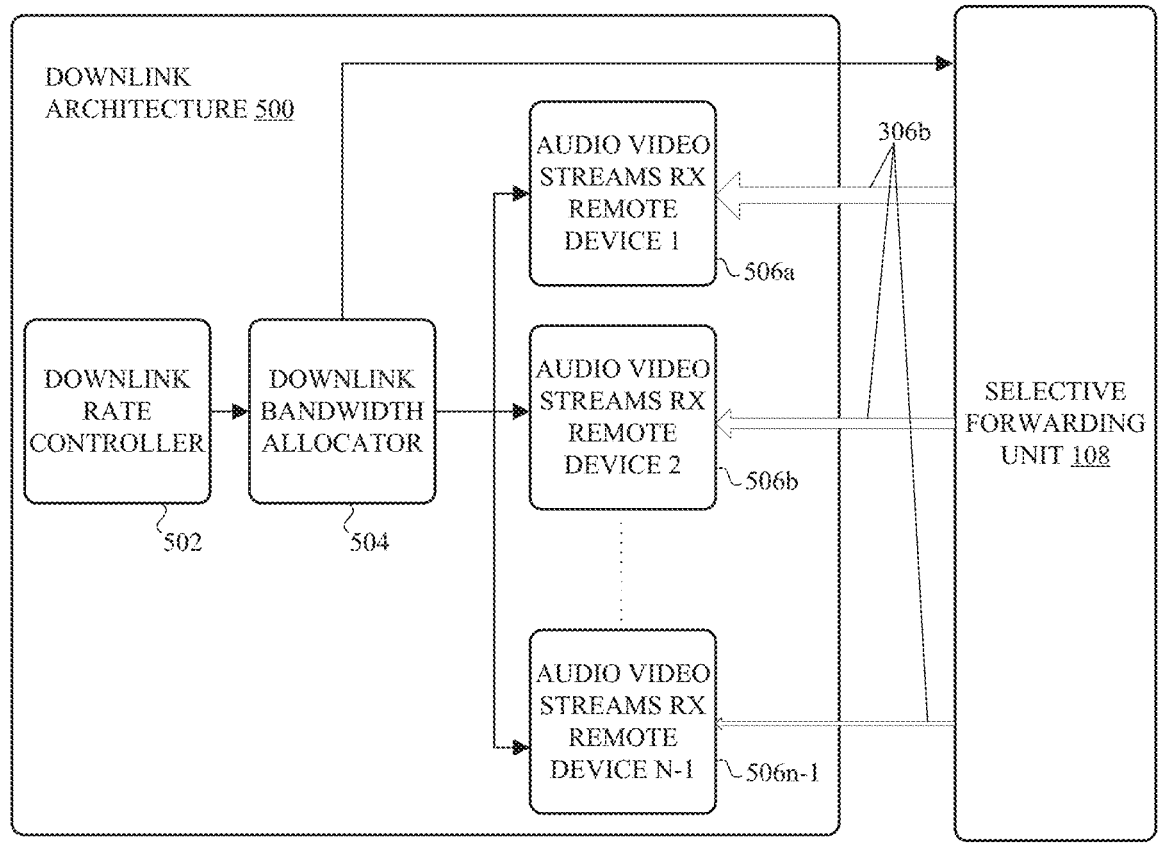
FIG. 5 illustrates an example downlink architecture for a device participating in multiway audio-video conferencing in accordance with one or more implementations.

FIG. 5 illustrates an example downlink architecture for a device participating in multiway audio-video conferencing in accordance with one or more implementations. In the example of FIG. 5, the downlink architecture 500 is illustrated and described with respect to the electronic device 103. However, the downlink architecture 500 can be implemented by one or more software modules running on the processor 202 of any of the electronic devices 102-105. In another example, the downlink architecture 500 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The downlink architecture 500 includes a downlink rate controller 502, a downlink bandwidth allocator 504, and audio/video stream receivers 506a-506n-1. The audio/video stream receivers 506a-506n-1 logically receive respective downlink content streams (e.g., the downlink content streams 306b) as transmitted by the sending devices (e.g., the electronic devices 102 and 104) and forwarded by the selective forwarding unit 310, as described above with respect to FIG. 3.

To receive the downlink content streams 306b, the downlink bandwidth allocator 504 may be configured to allocate respective bandwidths for each of the content streams 302b as received by the audio/video stream receivers 506a-506n-1. In addition, the downlink rate controller 502 may be configured to control or otherwise adjust the downlink bitrate for the received content streams.

In one or more implementations, the downlink architecture 500, including the downlink rate controller 502, the downlink bandwidth allocator 504 and the audio/video stream receivers 506a-506n-1 are implemented via software instructions, stored in the memory 204 (e.g., of the electronic device 103), which when executed by the processor 202, cause the processor 202 to perform particular function(s).

In one or more implementations, one or more of downlink rate controller 502, the downlink bandwidth allocator 504 and the audio/video stream receivers 506a-506n-1 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 6A:
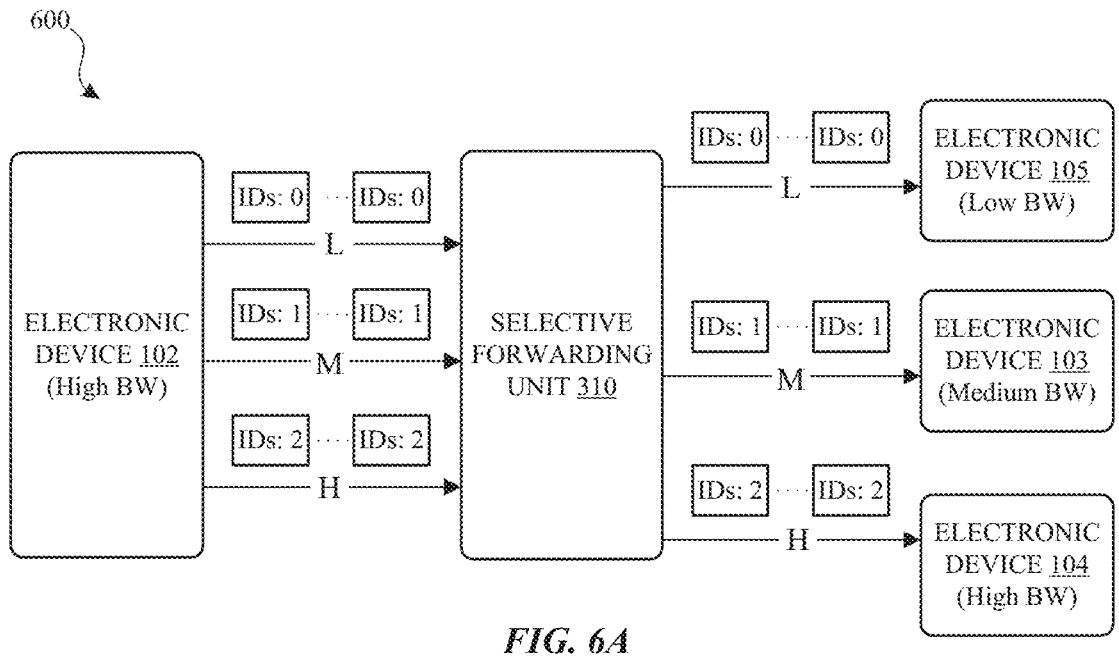
FIGS. 6A-6B illustrate an example system for multiway audio-video conferencing using compound stream identifiers in accordance with one or more implementations.
Figure 6B:
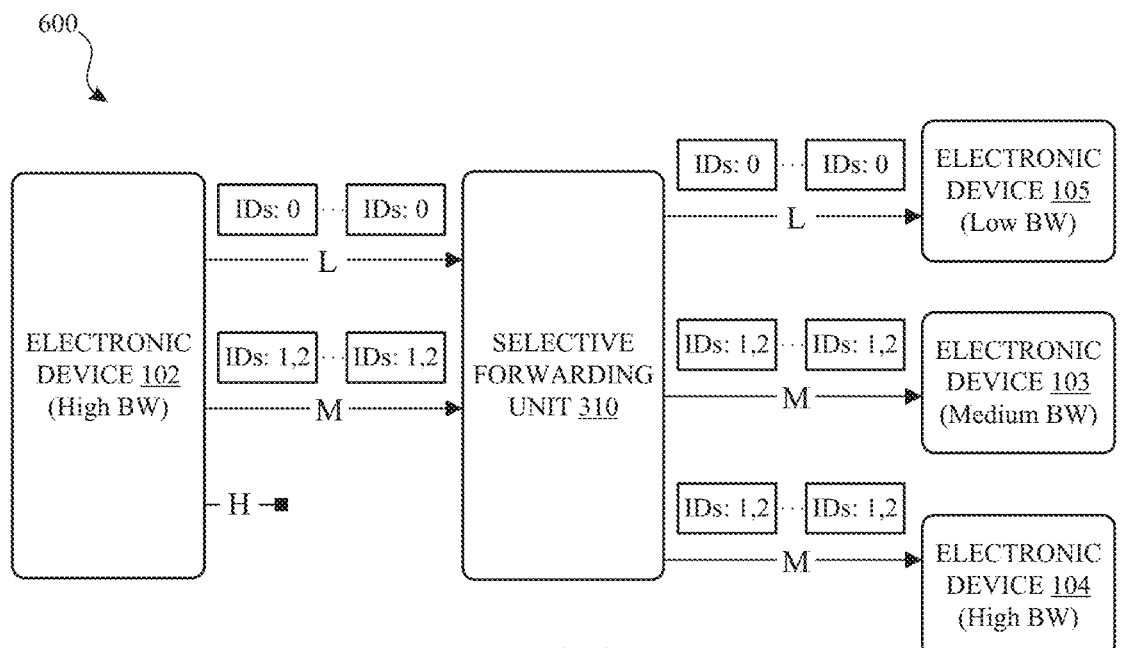

FIGS. 6A-6B illustrate an example system for multiway audio-video conferencing using compound stream identifiers in accordance with one or more implementations. For example, the system 600 can be implemented by one or more software modules running on the respective processors 202 of the server 108 and/or the electronic devices 102-105. In one or more implementations, the system 600 can be implemented by one or more software modules and/or by custom hardware (e.g., one or more coprocessors. ASICs, etc.). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As noted above, a receiving device (e.g., the electronic device 104) may switch from a high-quality content stream to a lower-quality content stream, for example, due to uplink bandwidth degradation associated with the sending device (e.g., the electronic device 102 disabling the high-quality content stream). The sending device may provide for a compound stream identifier, by associating the stream identifier for the high-quality stream with a lower-quality content stream. Since the receiving device is already subscribed to the higher-quality content stream (e.g., via its stream identifier), the receiving device may automatically begin to receive the lower-quality content stream, based on the association of the stream identifier with the lower-quality content stream. In one or more implementations, the receiving device may be required to receive a key frame from the new content stream, so as to property initialize the respective decoder for the new content stream.

Thus, in the example of FIG. 6A, the electronic device 102 may be providing 3 uplink content streams corresponding to low quality/bitrate (reference "L" in FIG. 6A), medium quality/bitrate ("M") and high quality/bitrate ("H"). Each of the content streams H, M and L may be initially identified by respective stream identifiers 0, 1 and 2 (e.g., as part of the initialization procedure). Since the electronic device 105 corresponds to low bandwidth, the electronic device 105 may receive the content stream L as identified by stream identifier 0. The electronic device 103 may correspond to correspond to medium bandwidth and as such, may receive the content stream M as identified by stream identifier 1. In addition, the electronic device 104 may correspond to correspond to high bandwidth and as such, may receive the content stream H as identified by stream identifier 2.

During the audio-video conferencing session, the electronic device 102 may experience uplink bandwidth degradation, and be configured to detect such bandwidth degradation as described above. In response, the electronic device 102 may disable its high quality-bitrate stream (e.g., the content stream H) as shown in FIG. 6B. However, the electronic device 102 may determine that at least one electronic device (e.g., the electronic device 104) is subscribed to content stream H. Thus, the electronic device 102 may associate the stream identifier 2 (e.g., for identifying the content stream H) with the content stream M. In this manner, the content stream M would be associated with two stream identifiers, namely its original stream identifier 1 and the newly-associated stream identifier 2. Since the electronic device 104 is already subscribed to the content stream H via the stream identifier 2, the receiving device may automatically begin to receiving the content stream M, based on the association of the stream identifier 2 with the content stream M. As noted above, the electronic device 104 may be required to receive a key frame from the content stream M, so as to property initialize the respective decoder for the content stream M.

By virtue of associating the stream identifier for the higher-quality stream with a lower-quality stream, the system 600 is able to reduce interruption and/or latency that may be typically associated with switching streams. For example, the receiving device may not be required to provide additional messaging to and/or from the selective forwarding unit 310. Rather, the receiving device may automatically begin receiving the lower-quality context based on a current stream identifier. Similarly, when the sending device can begin transmitting the higher-quality stream again, the sending device can disassociate the stream identifier for the higher-quality stream from the lower-quality stream and the receiving device can automatically begin receiving the higher-quality stream again.

Thus, the system 600 may provide for compound stream identifiers to facilitate stream switching. In one or more implementations, the system 600 may also provide for compound stream identifiers with respect to generating a low quality sub-stream of a content stream. The sub-stream may be derived from key frames of a given content stream. For example, given a periodic content stream (e.g., a video stream) corresponding to 15 frames/second, the electronic device 102 may tag all of the key frames with a new stream identifier, in order to generate a sub-stream. The sub-stream would correspond to a low quality stream of, e.g., 1 frame per second (e.g., where all frames correspond to key frames). Example uses of a sub-stream which is limited to key frames include, but are not limited to: transmission of motion JPG (e.g., for easier decoding), and facilitated key frame access (e.g., when a key frame is required for stream switching by a receiving device, as discussed above).

In one or more implementations, the components of the system 600 (e.g., the selective forwarding unit 310), are implemented via software instructions, stored in the memory 204 (e.g., of the server 108), which when executed by the respective processor 202, cause the respective processor 202 to perform particular function(s).

In one or more implementations, one or more of the components of the system 600 (e.g., the selective forwarding unit 310) may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 7:
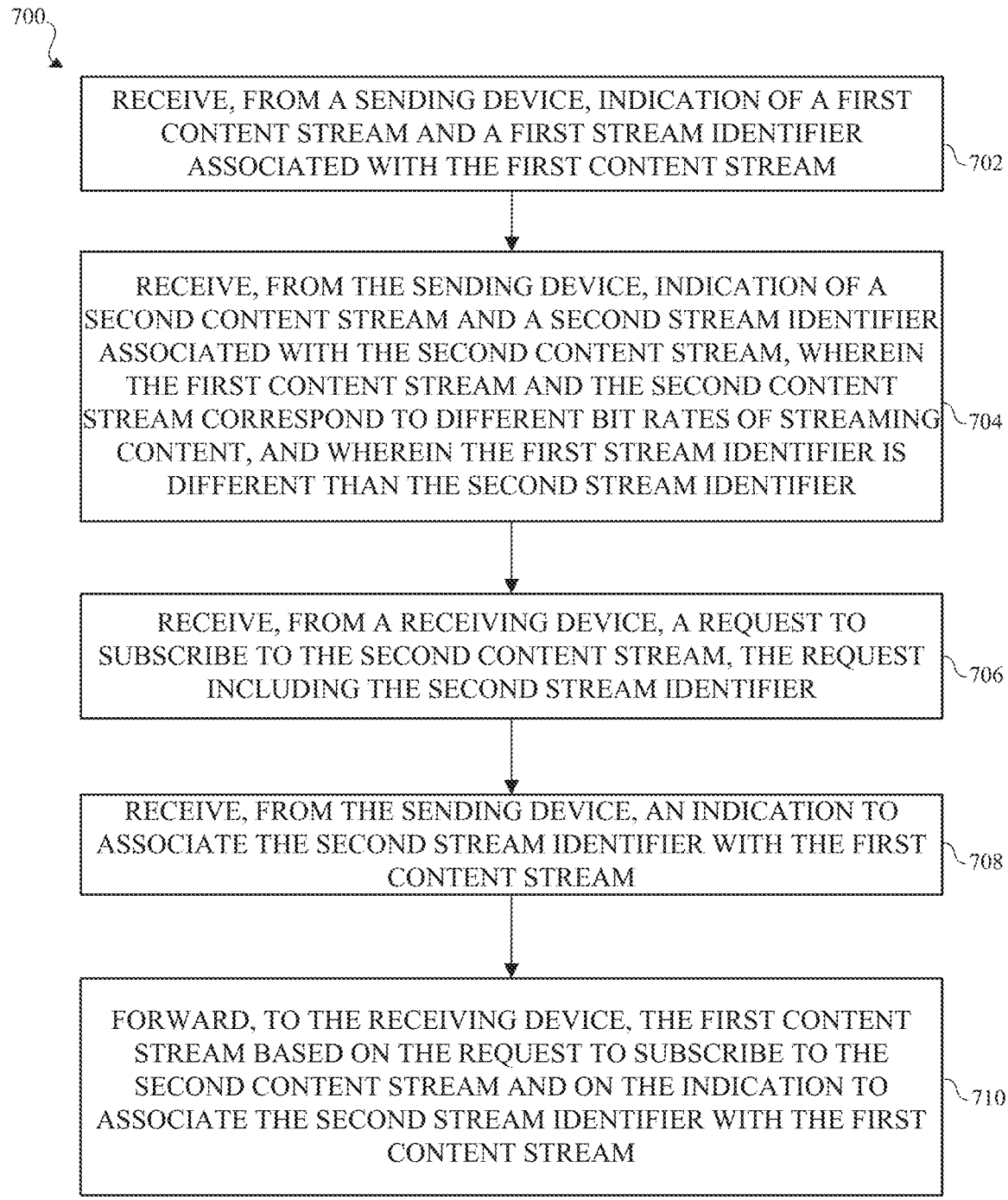
FIG. 7 illustrates an example process for multiway audio-video conferencing with stream switching in accordance with one or more implementations.

FIG. 7 illustrates an example process for multiway audio-video conferencing with stream switching in accordance with one or more implementations. For explanatory purposes, the process 700 is primarily described herein with reference to the server 108 and the electronic devices 102-103 of FIG. 1. However, the process 700 is not limited to the server 108 and the electronic devices 102-103 of FIG. 1, and one or more blocks (or operations) of the process 700 may be performed by one or more other components of the server 108 and other suitable devices (e.g., any of the electronic devices 102-105). Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The server 108 receives, from a sending device (e.g., the electronic device 102), indication of a first content stream and a first stream identifier associated with the first content stream (702). The server 108 receives, from the electronic device 102, indication of a second content stream and a second stream identifier associated with the second content stream (704).

The first content stream and the second content stream correspond to different bit rates of streaming content. For example, the second content stream may have a higher bit rate than that of the first content stream. The first stream identifier is different than the second stream identifier. In one or more implementations, the first and second content streams may have the same or similar bit rate, but the first and second content streams may differ in one or more other characteristics that impact the amount of bandwidth required to transmit/receive the content streams. For example, the first and second content streams may have different resolutions, frame rates, pixel depths, and the like.

The server 108 may receive, from the electronic device 102, indication of a first parity stream for the first content stream. The server 108 may receive, from a receiving device (e.g., the electronic device 103), an indication that the electronic device 103 is subscribed to the first parity stream. In addition, the server 108 may forward, to the electronic device 103, the first parity stream together with the first content stream based on the indication that the electronic device 103 is subscribed to the first parity stream.

The server 108 receives, from the electronic device 103, a request to subscribe to the second content stream, the request including the second stream identifier (706). The server 108 receives, from the electronic device 102, an indication that the second stream identifier has been associated with the first content stream (708). Thus, the first content stream may be associated with both the first stream identifier and the second stream identifier. As such, the first content stream may correspond with a compound stream identifier.

The indication that the second stream identifier has been associated with the first content stream may be based on a determination that the second content stream is unavailable. The determination that the second content stream is unavailable may be based on network degradation associated with an uplink of the electronic device 102.

The server 108 forwards, to the electronic device 103, the first content stream based on the request (e.g., from the electronic device 103) to subscribe to the second content stream and on the indication (e.g., by the electronic device 102) that the second stream identifier has been associated with the first content stream (710). The forwarding may include switching from forwarding the second content stream to forwarding the first content stream to the electronic device 103. The switching may be performed in association with receiving a key frame of the second content stream from the electronic device 102. The server 108 may receive, from the electronic device 102, indication of a third content stream corresponding to a sub-stream limited to key frames of the streaming content.

Figure 8:
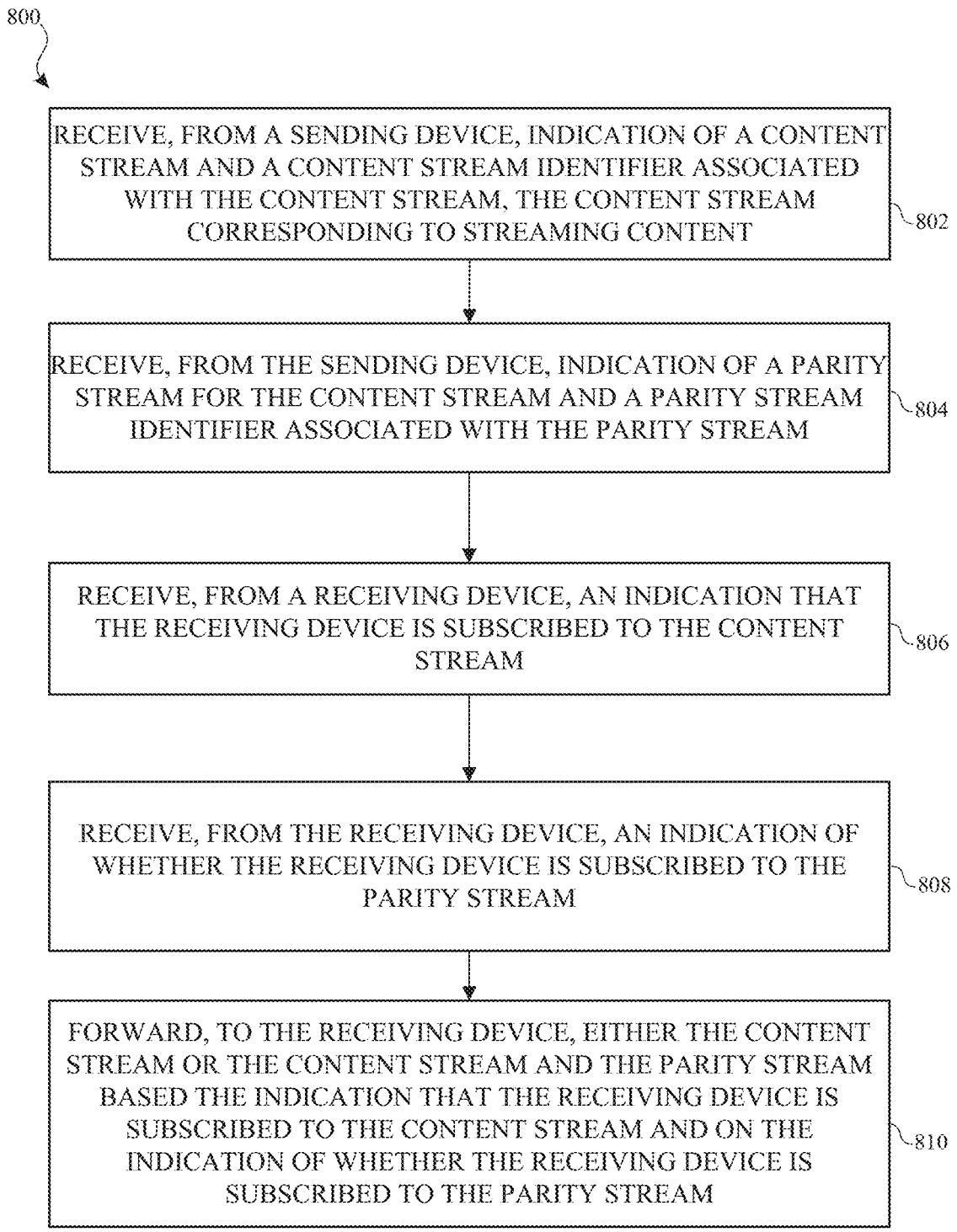
FIG. 8 illustrates an example process for multiway audio-video conferencing with parity streams in accordance with one or more implementations.

FIG. 8 illustrates an example process for multiway audio-video conferencing with parity streams in accordance with one or more implementations. For explanatory purposes, the process 800 is primarily described herein with reference to the server 108 and the electronic devices 102-103 of FIG. 1. However, the process 800 is not limited to the server 108 and the electronic devices 102-103 of FIG. 1, and one or more blocks (or operations) of the process 800 may be performed by one or more other components of the server 108 and by other suitable devices (e.g., any of the electronic devices 102-105). Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The server 108 receives, from a sending device (e.g., the electronic device 102), indication of a content stream and a content stream identifier associated with the content stream, the content stream corresponding to streaming content (802). As part of an initialization phase, the server 108 may receive, from the electronic device 102, first session information indicating respective identifiers for each content stream of the streaming content transmitted by the electronic device 102, together with respective identifiers for each parity stream available for those content streams. The server 108 may receive, from a receiving device (e.g., the electronic device 103), second session information indicating respective identifiers for each content stream of streaming content transmitted by the electronic device 103, together with respective identifiers for each parity stream available for those content streams. The server 108 may provide the first session information to the electronic device 103. The server 108 may provide the second session information to the electronic device 102.

Thus, the server 108 receives, from the electronic device 102, indication of a parity stream for the content stream and a parity stream identifier associated with the parity stream (804). The server 108 receives, from the electronic device 103, an indication that the electronic device 103 is subscribed to the content stream (806).

The server 108 receives, from the electronic device 103, an indication of whether the electronic device 103 is subscribed to the parity stream (808). The indication of whether the electronic device 103 is subscribed to the parity stream may be based on packet loss associated with a downlink of the electronic device 103.

The server 108 forwards, to the electronic device 103, either the content stream or the content stream and the parity stream based the indication that the electronic device 103 is subscribed to the content stream, and on the indication of whether the electronic device 103 is subscribed to the parity stream (810). The parity stream may be adjustable via a parity level. The parity level may be selectable from among a predefined set of parity levels (e.g., 25%, 500/%, 100%, 200%). In a case where the electronic device 103 is subscribed to the parity stream, the server 108 may: receive, from the electronic device 103, indication of the parity level for the parity stream; adjust the parity stream based on the parity level; and forward, to the electronic device 103, the content stream and the adjusted parity stream. The indication of the parity level may be based on packet loss associated with a downlink of the electronic device 103.

The server 108 may receive, from the electronic device 102, indication of a second content stream and a second content stream identifier associated with the second content stream, the second content stream corresponding to a different bit rate of the streaming content relative to the content stream. The server 108 may receive, from the electronic device 102, indication of a second parity stream for the second content stream and a second parity stream identifier associated with the second parity stream. The server 108 may receive, from the electronic device 103, an indication that the electronic device 103 is switching subscription from the content stream to either the second content stream or the second content stream and the second parity stream. The server 108 may forward, to the electronic device 103, either the second content stream or the second content stream and the second parity stream based on the indication that the electronic device 103 is switching subscription.

Figure 9:
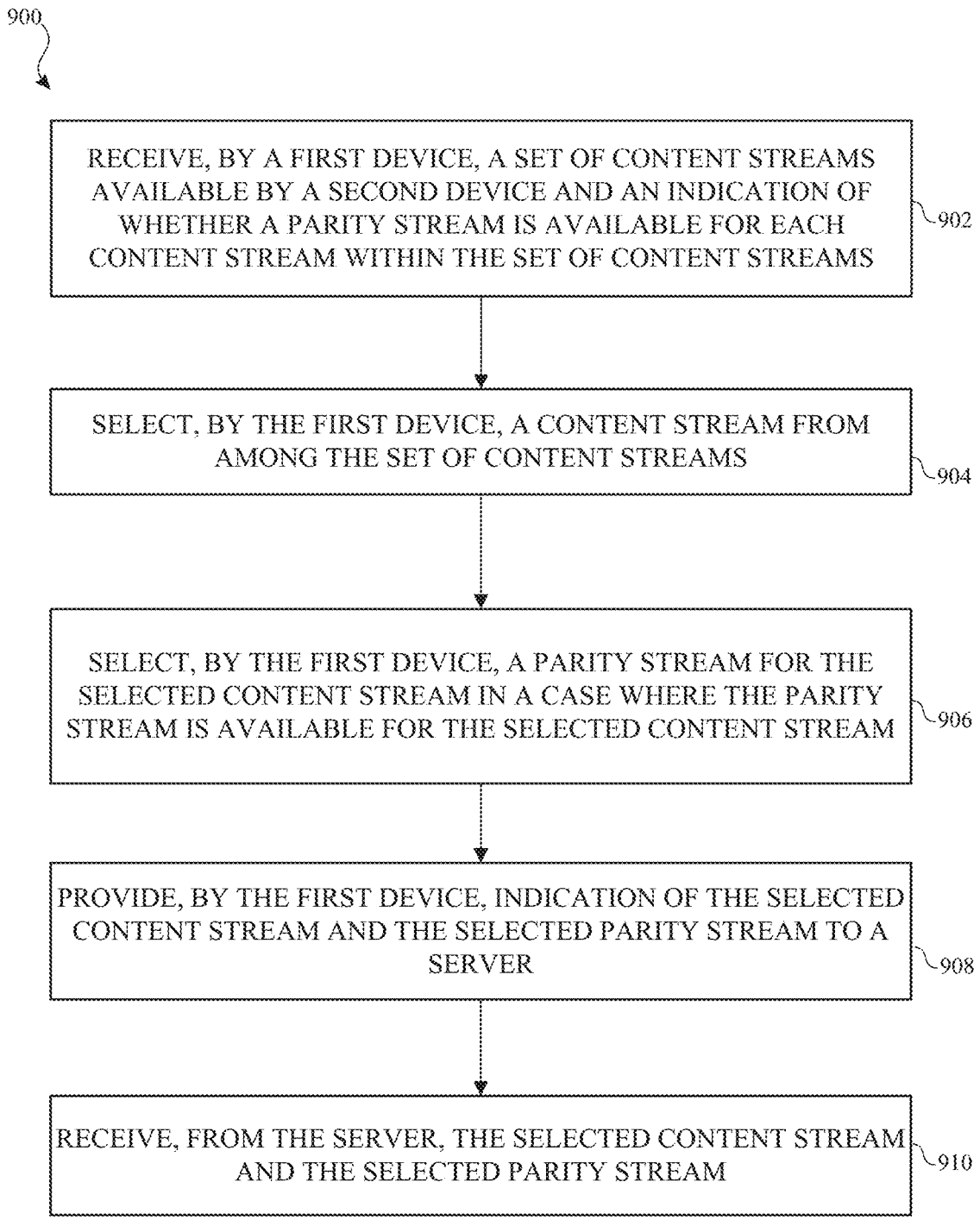
FIG. 9 illustrates another example process for multiway audio-video conferencing with parity streams in accordance with one or more implementations.

FIG. 9 illustrates another example process for multiway audio-video conferencing with parity streams in accordance with one or more implementations. For explanatory purposes, the process 900 is primarily described herein with reference to the server 108 and the electronic devices 102-103 of FIG. 1. However, the process 900 is not limited to the server 108 and the electronic devices 102-103 of FIG. 1, and one or more blocks (or operations) of the process 900 may be performed by one or more other components of the server 108 and by other suitable devices (e.g., any of the electronic devices 102-105). Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

A receiving device (e.g., the electronic device 103) receives an indication of a set of content streams available by a sending device (e.g., the electronic device 102) and an indication of whether a parity stream is available for each content stream within the set of content streams (902).

The electronic device 103 subscribes to a content stream from among the set of content streams (904). The electronic device 103 subscribes to a parity stream for the content stream in a case where the parity stream is available for the content stream (906).

The electronic device 103 provides indication of subscribing to the content stream and the parity stream to a server 108 (908). The electronic device 103 receives the content stream and the parity stream (910).

The electronic device 103 may detect an error associated with the content stream, and subscribe, in response to the detecting, to a second content stream from among the set of content streams, together with a second parity stream for the second content stream in a case where the second parity stream is available for the second content stream. The electronic device 103 may provide an indication of subscribing to the second content stream and the second parity stream to the server 108, and receive, in response providing the indication of subscribing to the second content stream and the second parity stream, the second content stream and the second parity stream.

The electronic device 103 may receive a second set of content streams available on a third device and an indication of whether a parity stream is available for each content stream within the second set of content streams, and subscribe to a second content stream from among the second set of content streams. The electronic device 103 may subscribe to a second parity stream for the second content stream in a case where the second parity stream is available for the second content stream. The electronic device 103 may provide indication of subscribing to the second content stream and the second parity stream to the server 108, and receive, in response providing the indication of subscribing to the second content stream and the second parity stream, the second content stream and the second parity stream.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 10:
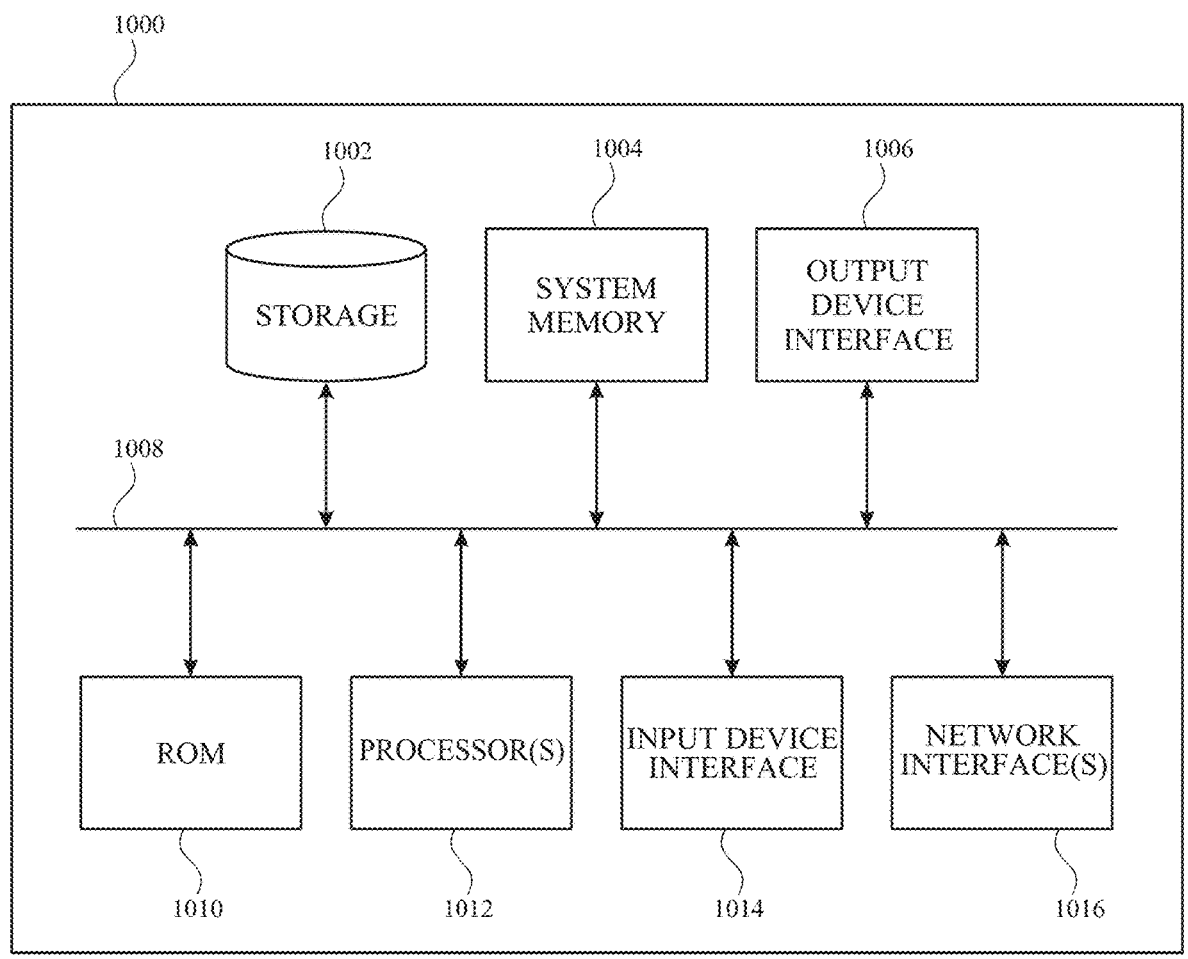
FIG. 10 illustrates an example electronic system with which aspects of the subject technology may be implemented in accordance with one or more implementations.

FIG. 10 illustrates an electronic system 1000 with which one or more implementations of the subject technology may be implemented. The electronic system 1000 can be, and/or can be a part of, one or more of the electronic devices 102-105, and/or one or the server 108 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the server 108 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
at least one processor; and
a memory including instructions that, when executed by the at least one processor, cause the at least one processor to:
 receive, from a sending device, indication of a first content stream and a first stream identifier associated with the first content stream;
 receive, from the sending device, indication of a second content stream and a second stream identifier associated with the second content stream, wherein the first content stream and the second content stream correspond to different bit rates of streaming content, and wherein the first stream identifier is different than the second stream identifier;
 receive, from a receiving device, a request to subscribe to the second content stream, the request including the second stream identifier;
 forward, to the receiving device, the second content stream based on the received request to subscribe to the second content stream;
 receive, from the sending device, an indication that the second stream identifier has been associated with the first content stream; and
 switch from forwarding, to the receiving device, the second content stream to forwarding, to the receiving device, the first content stream, based on the received request to subscribe to the second content stream and on the received indication that the second stream identifier has been associated with the first content stream.

2. The device of claim 1, wherein the switching is performed in association with receiving a key frame of the second content stream from the sending device.

3. The device of claim 1, wherein the instructions further cause the at least one processor to:
receive, from the sending device, indication of a third content stream corresponding to a sub-stream limited to key frames of the streaming content.

4. The device of claim 1, wherein the indication that the second stream identifier has been associated with the first content stream is based on a determination that the second content stream is unavailable.

5. The device of claim 4, wherein the determination that the second content stream is unavailable is based on network degradation associated with an uplink of the sending device.

6. The device of claim 1, wherein the instructions further cause the at least one processor to:
receive, from the sending device, indication of a first parity stream for the first content stream;
receive, from the receiving device, an indication that the receiving device is subscribed to the first parity stream; and
forward, to the receiving device, the first parity stream together with the first content stream based on the indication that the receiving device is subscribed to the first parity stream.

7. The device of claim 1, wherein the first content stream is associated with both the first stream identifier and the second stream identifier.

8. The device of claim 1, wherein the second content stream has a higher bit rate than that of the first content stream.

9. A non-transitory computer-readable storage medium comprising code that, when executed by one or more processors, causes the one or more processors to perform operations comprising:
 receive, from a sending device, indication of a content stream and a content stream identifier associated with the content stream, the content stream corresponding to streaming content;
 receive, from the sending device, indication of a parity stream for the content stream and a parity stream identifier associated with the parity stream;
 receive, from a receiving device, an indication that the receiving device is subscribed to the content stream;
 receive, from the receiving device, an indication of whether the receiving device is subscribed to the parity stream; and
 forward, to the receiving device, either the content stream or the content stream and the parity stream based on the indication that the receiving device is subscribed to the content stream and on the indication of whether the receiving device is subscribed to the parity stream.

10. The non-transitory computer-readable storage medium of claim 9, wherein the indication of whether the receiving device is subscribed to the parity stream is based on packet loss associated with a downlink of the receiving device.

11. The non-transitory computer-readable storage medium computer program product of claim 9, wherein the parity stream is adjustable via a parity level.

12. The non-transitory computer-readable storage medium of claim 11, wherein the parity level is selectable from among a predefined set of parity levels.

13. The non-transitory computer-readable storage medium of claim 11, wherein operations further comprise in a case where the receiving device is subscribed to the parity stream:
 receive, from the receiving device, indication of the parity level for the parity stream,
 adjust the parity stream based on the parity level; and
 forward, to the receiving device, the content stream and the adjusted parity stream.

14. The non-transitory computer-readable storage medium of claim 11, wherein the indication of the parity level is based on packet loss associated with a downlink of the receiving device.

15. The non-transitory computer-readable storage medium of claim 9, wherein the operations further comprise:
 receive, from the sending device, indication of a second content stream and a second content stream identifier associated with the second content stream, the second content stream corresponding to a different bit rate of the streaming content relative to the content stream;
 receive, from the sending device, indication of a second parity stream for the second content stream and a second parity stream identifier associated with the second parity stream;

receive, from the receiving device, an indication that the receiving device is switching subscription from the content stream to either the second content stream or the second content stream and the second parity stream; and forward, to the receiving device, either the second content stream or the second content stream and the second parity stream based on the indication that the receiving device is switching subscription.

16. The non-transitory computer-readable storage medium of claim 9, wherein the operations further comprise:

receive, from the sending device, first session information indicating respective identifiers for each content stream of the streaming content transmitted by the sending device, together with respective identifiers for each parity stream available for those content streams;

receive, from receiving device, second session information indicating respective identifiers for each content stream of streaming content transmitted by the receiving device, together with respective identifiers for each parity stream available for those content streams;

provide the first session information to the receiving device; and provide the second session information to the sending device.

17. The non-transitory computer-readable storage medium of claim 9, wherein the parity stream comprises error correcting code for recovery of content of the content stream.

18. A method, comprising:

receiving, by a first device, a set of content streams available by a second device and an indication of whether a parity stream is available for each content stream within the set of content streams;

subscribing, by the first device, to a content stream from among the set of content streams;

subscribing, by the first device, to a parity stream for the content stream in a case where the parity stream is available for the content stream;

providing, by the first device, indication of subscribing to the content stream and the parity stream to a server; and receiving, from the server, the content stream and the parity stream, the parity stream comprising error correcting code for recovery of content of the content stream.

19. The method of claim 18, further comprising:

detecting an error associated with the content stream;

subscribe, in response to the detecting, to a second content stream from among the set of content streams, together with a second parity stream for the second content stream in a case where the second parity stream is available for the second content stream;

providing an indication of subscribing to the second content stream and the second parity stream to the server; and receiving, in response providing the indication of subscribing to the second content stream and the second parity stream, the second content stream and the second parity stream.

20. The method of claim 18, further comprising:

receiving, by the first device, a second set of content streams available on a third device and an indication of whether a parity stream is available for each content stream within the second set of content streams;

subscribing, by the first device, to a second content stream from among the second set of content streams;

subscribing, by the first device, to a second parity stream for the second content stream in a case where the second parity stream is available for the second content stream;

providing, by the first device, indication of subscribing to the second content stream and the second parity stream to the server; and receiving, in response providing the indication of subscribing to the second content stream and the second parity stream, the second content stream and the second parity stream.

\* \* \* \* \*

UNITED STATES PATENT AND TRADEMARK OFFICE
CERTIFICATE OF CORRECTION

Page 1 of 1

PATENT NO. : 10,931,725 B2
APPLICATION NO. : 16/147527
DATED : February 23, 2021
INVENTOR(S) : Christopher M. Garrido et al.

It is certified that error appears in the above-identified patent and that said Letters Patent is hereby corrected as shown below:

In the Claims

Column 24, Line 39 (Claim 11), Remove "computer program product".

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*